(12) United States Patent
Dhankhar (10) Patent No.: US 12,321,981 B2
(45) Date of Patent: Jun. 3, 2025

(54) AUTOMATED OBJECT RECOGNITION KIOSK FOR RETAIL CHECKOUTS

(71) Applicant: Mashgin Inc., Palo Alto, CA (US)

(72) Inventor: Mukul Dhankhar, Palo Alto, CA (US)

(73) Assignee: Mashgin Inc., Palo Alto, CA (US)

( * ) Notice: Subject to any disclaimer, the term of this patent is extended or adjusted under 35 U.S.C. 154(b) by 57 days.

(21) Appl. No.: 18/079,754

(22) Filed: Dec. 12, 2022

(65) Prior Publication Data

US 2023/0112491 A1 Apr. 13, 2023

Related U.S. Application Data (63) Continuation of application No. 17/129,296, filed on Dec. 21, 2020, now Pat. No. 11,551,287, which is a continuation-in-part of application No. 16/168,066, filed on Oct. 23, 2018, now abandoned, which is a continuation of application No. 14/517,634, filed on Oct. 17, 2014, now Pat. No. 10,366,445.

(60) Provisional application No. 61/891,902, filed on Oct. 17, 2013.

(51) Int. Cl.
*G06Q 30/0601* (2023.01)
*G01G 19/40* (2006.01)

(52) U.S. Cl.
CPC ......... *G06Q 30/0641* (2013.01); *G01G 19/40* (2013.01)

(58) Field of Classification Search
CPC ............................ G06Q 30/0641; G01G 19/40
See application file for complete search history.

(56) References Cited

U.S. PATENT DOCUMENTS

| | | |
|---|---|---|
| 6,363,366 B1 | 3/2002 | Henty |
| 9,327,406 B1 | 5/2016 | Hinterstoisser et al. |
| 2005/0052535 A1 | 3/2005 | Hamadi |
| 2005/0088529 A1 | 4/2005 | Geng |
| 2005/0163382 A1 | 7/2005 | Herley |
| 2005/0189411 A1 | 9/2005 | Ostrowski et al. |
| 2006/0043174 A1 | 3/2006 | Banavar et al. |
| 2006/0208169 A1 | 9/2006 | Breed et al. |

(Continued)

FOREIGN PATENT DOCUMENTS

| | | |
|---|---|---|
| DE | 19536294 A1 | 4/1997 |
| DE | 102014111656 A1 | 2/2016 |
| JP | 2009042082 A | 2/2009 |

*Primary Examiner* — Hesham K Abouzahra
(74) *Attorney, Agent, or Firm* — Jeffrey Schox; Diana Lin (57) ABSTRACT

A system, method, and apparatus for automated object recognition and checkout at a retail kiosk is provided. The system includes a controller configured with a processor and a memory to control operations of the automated retail checkout system. The system further includes an imaging device in communication with the controller and configured to create multiple electronic images of an object, such as a product for purchase. The system also includes an object recognition device in communication with the controller and the imaging device. The processor may execute software to receive electronic images from the imaging device, extract at least one feature from the images, and recognize the object based on a predetermined model being applied to the extracted feature from the images. The system also includes a display device to display an indication of the recognized object from the object recognition device.

20 Claims, 5 Drawing Sheets

(56) References Cited

U.S. PATENT DOCUMENTS

| | | |
|---|---|---|
| 2008/0252985 A1 | 10/2008 | Zhu et al. |
| 2009/0268967 A1 | 10/2009 | Simon et al. |
| 2010/0059589 A1 | 3/2010 | Goncalves et al. |
| 2010/0166294 A1 | 7/2010 | Marrion et al. |
| 2010/0217678 A1* | 8/2010 | Goncalves ........... G07G 1/0063 |
| | | 382/209 |
| 2010/0232681 A1 | 9/2010 | Fujieda et al. |
| 2013/0010081 A1 | 1/2013 | Tenney et al. |
| 2013/0223673 A1 | 8/2013 | Davis et al. |
| 2013/0306727 A1 | 11/2013 | Shearin et al. |
| 2013/0314541 A1 | 11/2013 | Lord et al. |
| 2014/0034731 A1* | 2/2014 | Gao ....................... G06K 7/146 |
| | | 235/438 |
| 2014/0036630 A1 | 2/2014 | Herwig |
| 2015/0009214 A1 | 1/2015 | Lee et al. |
| 2015/0066201 A1 | 3/2015 | Wubbena et al. |
| 2015/0109451 A1 | 4/2015 | Dhankhar |
| 2016/0063821 A1 | 3/2016 | MacIntosh et al. |
| 2016/0110913 A1 | 4/2016 | Kosoy et al. |
| 2016/0269714 A1 | 9/2016 | Rhemann et al. |
| 2016/0364634 A1 | 12/2016 | Davis et al. |
| 2017/0054965 A1 | 2/2017 | Raab et al. |
| 2017/0278308 A1 | 9/2017 | Bleiweiss et al. |
| 2018/0103209 A1 | 4/2018 | Fischler et al. |
| 2018/0189763 A1 | 7/2018 | Olmstead et al. |
| 2019/0096198 A1* | 3/2019 | Landers, Jr. ............. G01S 19/13 |
| 2019/0371134 A1 | 12/2019 | Chen et al. |

* cited by examiner

AUTOMATED OBJECT RECOGNITION KIOSK FOR RETAIL CHECKOUTS

CROSS-REFERENCE TO RELATED APPLICATIONS

This application is a continuation of U.S. application Ser. No. 17/129,296, filed 21 Dec. 2020, which is a continuation in part of U.S. application Ser. No. 16/168,066 filed 23 Oct. 2018, which is a continuation of U.S. application Ser. No. 14/517,634, filed 17 Oct. 2014, which claims the benefit of U.S. Provisional Application No. 61/891,902 filed 17 Oct. 2013, each of which are incorporated in their entireties by this reference.

TECHNICAL FIELD

The presently disclosed embodiments relate to retail stores, and more particularly to an object recognition kiosk for retail checkouts.

BACKGROUND

Retail outlets (e.g., supermarkets, cafeterias, etc.) offer sale of various products and services. The outlets are typically equipped with self-checkout kiosks that allow a shopper to scan the products selected for purchase on their own to receive indicia of their prices. The shopper may then use the indicia to make a payment for completing the product purchase.

The products are available either as packaged items or fresh items for purchase. The packaged items typically carry identification markers such as bar codes and radio frequency identification (RFID) tags, which are scanned by relevant scanners equipped with the self-checkout kiosks. However, the fresh items (e.g., freshly cooked meals such as different types of curries, pastas, and breads; various salads; fresh fruits and vegetables; etc.) are often untagged and/or unpacked, and require a store attendant to intervene for enabling their purchase. The store attendant traditionally uses his personal assessment of the type and number of ingredients for each fresh item and manually inputs the assessed information to a checkout kiosk for expected payment to complete the purchase.

Since the collection of fresh items at the retail outlets may change based on customer demand or product offerings, the assessed information may vary based on related inventory knowledge and skill of the store attendant. As a result, the assessed information may become susceptible to error and hence business loss. The probability of erroneous assessment increases when various fresh items are mixed together based on customer request or as a new product offering. Such assisted checkouts for fresh items may also become labor intensive and time consuming based on the quantity of fresh items being checked out. Further, customer queues may become bottlenecks during peak periods of customer demand, possibly to provoke the customers to leave the retail outlet to shop elsewhere. Other sales may be lost from customers who may simply avoid a retail location at known busy times and shop elsewhere, because of past inconvenience from delays.

Therefore, there exists a need for an automated object recognition kiosk for retail checkout of fresh foods and provide a seamless retail checkout experience for better customer service.

SUMMARY

In view of the deficiencies in the conventional methodologies for retail checkout at a kiosk, the disclosed subject matter provides a system, method, and apparatus for automated object recognition and checkout at a retail kiosk.

According to one aspect of the disclosed subject matter, a system for automated retail checkout is provided. In an aspect, a controller of the system can be configured with a processing system and a memory to control operations of the automated retail checkout system. In other aspects, an imaging device can be in communication with the controller and configured to create one or more electronic images of an object, such as a product for purchase. In further aspects, an object recognition device can be in communication with the controller and the imaging device. The object recognition device can be configured with a processing system executing software to receive electronic images from the imaging device, extract at least one feature from the one or more of the images, and recognize the object based on a predetermined model of objects from an object database being applied to the feature from the one or more images. In another aspect, a display device can be configured with the system to display an indication from the object recognition device of the recognized object.

According to one embodiment of the disclosed subject matter, the at least one feature extracted from the one or more images by the software can be used by the processing system to train the object recognition device using a predetermined machine learning method that formulates the model based on recognizing the at least one feature from the object. In another embodiment, an illumination device can be configured by the controller to generate light having a predetermined level of brightness and to illuminate the object using the generated light. In yet another embodiment, the object recognition device measures a change in lighting from a calibration pattern as perceived by the imaging device after the electronic image of the object is created by the imaging device. According to another embodiment, the imaging device comprises a group of maneuverable cameras, and the controller can automatically calibrate positions of the group of cameras relative to the object based on the calibration pattern. According to still another embodiment, the object recognition device analyzes the one or more electronic images from the imaging device and tracks a movement of a support structure in communication with the object. In further embodiments, the controller can adaptively tune the illumination device to generate light to illuminate the object based on the calibrated positions of the cameras and the position of the object. According to another embodiment, a weight sensor can be in communication with the controller and configured to measure weight of the object.

According to another aspect of the disclosed subject matter, computer-implemented methodology for purchasing a product with a retail checkout apparatus is provided. In an aspect, a methodology for controlling operations of the retail checkout apparatus with a computer includes providing a processing system for executing software instructions for illuminating, with an illumination device having a predetermined level of brightness controlled by the computer, a predetermined region of the retail checkout apparatus. The methodology further includes capturing, with an imaging device controlled by the computer, one or more images of a product located within the predetermined region; and recognizing, by the computer, an identity of the product based on a predetermined model being applied to the captured one or more images. In another aspect, the methodology includes providing, by the computer, an indication of the recognized product based on one or more predefined attributes of the determined product. In one aspect, the methodology includes displaying, by the computer on a display interface, at least a portion of the provided indication for completing a purchase of the product.

According to another aspect of the disclosed subject matter, an apparatus for retail checkouts is provided. In an aspect, a head portion of the apparatus includes an illumination device and an imaging device. In another aspect, a base portion can be oriented a predetermined distance below the head portion to create an object examination space between the head portion and base portion. In other aspects, the illumination device can be configured to generate light within the object examination space having a predetermined level of brightness and illuminate the object using the generated light, and the imaging device can be configured to create one or more electronic images of the illuminated object within the object examination space. In another aspect of the disclosure, an electronics portion, operationally connected to the imaging device and the illumination device, can include a processing system programmed with software to execute instructions to receive the one or more electronic images from the imaging device. The processing system is further programmed with the software to extract at least one feature from the one or more images of the object, and recognize the object based on a predetermined model of objects from an object database being applied to the feature from the one or more electronic images. In another aspect of the apparatus, a display device can be operationally connected to the head portion and configured to display an indication of the object recognition from the software.

Other and further aspects and features of the disclosure will be evident from reading the following detailed description of the embodiments, which are intended to illustrate, not limit, the present disclosure.

DESCRIPTION OF THE PREFERRED EMBODIMENTS

The following detailed description is made with reference to the figures. Preferred embodiments are described to illustrate the disclosure, not to limit its scope, which is defined by the claims. Those of ordinary skill in the art will recognize a number of equivalent variations in the description that follows.

1. Definitions

A "feature" is used in the present disclosure in the context of its broadest definition. The feature may refer to a property of an entity such as an image or an object. Examples of the property may include, but not limited to, size, shape, brightness, color, and texture.

A "model" or "equation" is used in the present disclosure in the context of its broadest definition. The model may refer to a mathematical representation involving one or more parameters, each of which may correspond to the feature.

2. Exemplary Embodiments

Figure 1:
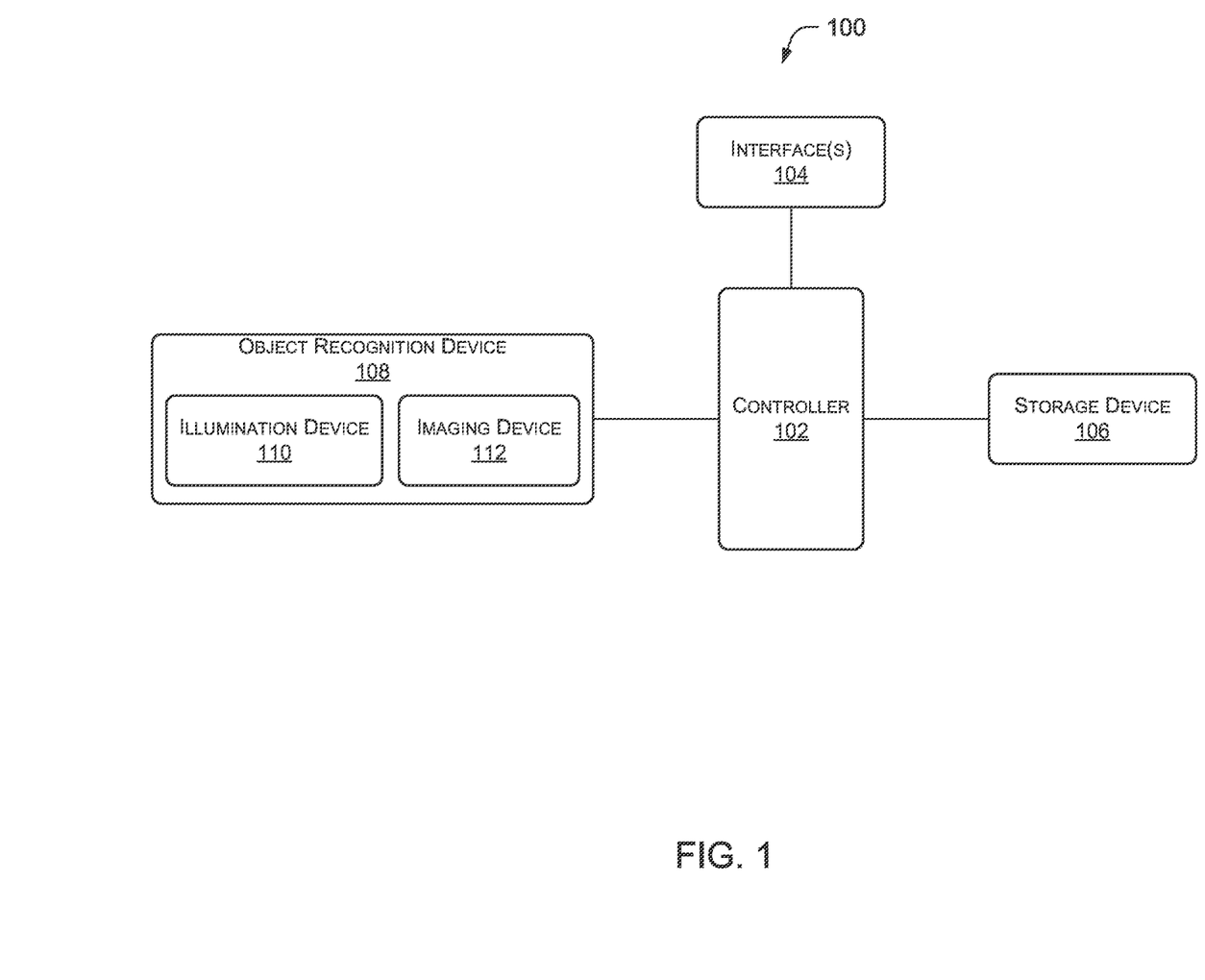
FIG. 1 is a schematic that illustrates an exemplary object recognition system, according to an embodiment of the present disclosure.

FIG. 1 is a schematic that illustrates an exemplary object recognition system 100, according to an embodiment of the present disclosure. Some embodiments are disclosed in the context of an automated object recognition kiosk for retail checkout, e.g., in a cafeteria involving recognition of fresh foods including, but not limited to, fresh fruits and vegetables, dairy products, freshly prepared eatables such as curries, breads, pastas, salads, and burgers; or any combination thereof. However, other embodiments may be applied in the context of various business scenarios involving object recognition. Examples of such scenarios may include, but not limited to, self-checkout of products by customers in a supermarket, fast food restaurants, or coffee shops; multi-product packaging of diversified products in a packaging plant; product quality control in a manufacturing plant; advanced driver assistance systems such as automatic parking systems; public surveillance systems; and automatic teller machines (ATMs).

The object recognition system 100 may represent any of a wide variety of devices capable of providing automated object recognition services to various devices. The object recognition system 100 may be implemented as a standalone and dedicated "black box" including hardware and installed software, where the hardware is closely matched to the requirements and/or functionality of the software. In some embodiments, the object recognition system 100 may enhance or increase the functionality and/or capacity of a network to which it may be connected. The object recognition system 100 of some embodiments may include software, firmware, or other resources that support remote administration, operation, and/or maintenance of the object recognition system 100.

In one embodiment, the object recognition system 100 may be implemented as or in communication with any of a variety of computing devices (e.g., a desktop PC, a personal digital assistant (PDA), a server, a mainframe computer, a mobile computing device (e.g., mobile phones, laptops, etc.), an internet appliance, etc.). In some embodiments, the object recognition system 100 may be integrated with or implemented as a wearable device including, but not limited to, a fashion accessory (e.g., a wrist band, a ring, etc.), a utility device (a hand-held baton, a pen, an umbrella, a watch, etc.), a body clothing, or any combination thereof.

Other embodiments may include the object recognition system 100 being implemented by way of a single device (e.g., a computing device, processor or an electronic storage device 106) or a combination of multiple devices. The object recognition system 100 may be implemented in hardware or a suitable combination of hardware and software. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications.

As illustrated, the object recognition system 100 may include a controller 102 in communication with, or integrated with, interface(s) 104, a storage device 106, an object recognition device 108, and/or a processing system 530. The controller 102 may execute machine readable program instructions for processing data (e.g., video data, audio data, textual data, etc.) and instructions received from one or more devices such as the object recognition device 108, and so on. The controller 102 may include, for example, microprocessor, microcomputers, microcontrollers, digital signal processors, central processing units, state machines, logic circuits, and/or any devices that may manipulate signals based on operational instructions. Among other capabilities, the controller 102 may be configured to fetch and execute computer readable instructions in the storage device 106 associated with the object recognition system 100. In some embodiments, the controller 102 may be configured to convert communications, which may include instructions, queries, data, etc., from one or more devices such as the object recognition device 108 into appropriate formats to make these communications compatible with a third-party data application, network devices, or interfaces such as output devices, and vice versa. Consequently, the controller 102 may allow implementation of the storage device 106 using different technologies or by different organizations, e.g., a third-party vendor, managing the storage device 106 using a proprietary technology. In some other embodiments, the controller 102 may comprise or implement one or more real time protocols (e.g., session initiation protocol (SIP), H.261, H.263, H.264, H.323, etc.) and non-real time protocols known in the art, related art, or developed later to facilitate communication with one or more devices.

The processing system 530 can function to process the set of images to determine the item class. All or a portion of the processing system is preferably local to the kiosk, but can alternatively be remote (e.g., a remote computing system), distributed between the local and remote system, distributed between multiple local systems, distributed between multiple kiosks, and/or otherwise configured. The processing system preferably includes one or more processors (e.g., CPU, GPU, TPU, microprocessors, etc.). The processing system can optionally include memory (e.g., RAM, flash memory, etc.) or other nonvolatile computer medium configured to store instructions for method execution, repositories, and/or other data. When the processing system is remote or distributed, the system can optionally include one or more communication modules, such as long-range communication modules (e.g., cellular, internet, Wi-Fi, etc.), short range communication modules (e.g., Bluetooth, Zigbee, etc.), local area network modules (e.g., coaxial cable, Ethernet, WiFi, etc.), and/or other communication modules.

The object recognition system 100 may include a variety of known, related art, or later developed interface(s) 104, including software interfaces (e.g., an application programming interface, a graphical user interface, etc.); hardware interfaces (e.g., cable connectors, a keyboard, a card reader, a barcode reader, a biometric scanner, an interactive display screen, a printer, etc.); or both. The interface(s) 104 may facilitate communication between various devices such as the controller 102, the storage device 106, and the object recognition device 108 within the object recognition system 100.

In some embodiments, the interface(s) 104 may facilitate communication with other devices capable of interacting with the object recognition system 100 over a network (not shown). The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or sub-networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice, video, and data communications.

The storage device 106 may be configured to store, manage, or process at least one of (1) data in a database related to the object being detected or recognized, and (2) a log of profiles of various devices coupled to the controller 102 and associated communications including instructions, queries, data, and related metadata. The storage device 106 may comprise of any computer-readable medium known in the art, related art, or developed later including, for example, volatile memory (e.g., RAM), non-volatile memory (e.g., flash, etc.), disk drive, etc., or any combination thereof. Examples of the storage device 106 may include, but not limited to, a storage server, a portable storage device (e.g., a USB drive, an external hard drive, etc.), and so on. The server may be implemented as any of a variety of computing devices including, for example, a general purpose computing device, multiple networked servers (arranged in clusters or as a server farm), a mainframe, or so forth.

The object recognition device 108 may be configured to recognize an object using various computer vision and machine learning methods known in the art, related art, or developed later based on various attributes including, but not limited to, shape, size, texture, and color of the object. The object recognition device 108 may include and/or communicate with an illumination device 110 and may include and/or communicate with an imaging device 112. The illumination device no (e.g., compact fluorescent tubes, bulbs, light emitting diodes, etc.) may be configured to substantially illuminate the object for being recognized by the object recognition device 108. The imaging device 112 (e.g., a camera, a laser scanner, etc.) may be configured to create or capture an image of the illuminated object to be recognized. The created or captured image may be processed by the object recognition device 108 to recognize the object being scanned by the imaging device 112.

The object recognition device 108 may receive multiple such object images from the database in the storage device 106, or the imaging device 112, or both, as a training dataset corresponding to a variety of objects for training the object recognition system 100 so that one or more images of an object scanned or captured by the imaging device 112 are analyzed and recognized by the object recognition device 108. Various features may be extracted from the training dataset. Examples of the features may include, but not limited to, shape, size, color, texture, and so on related to the object. The object recognition device 108 may apply various known in the art, related art, or developed later machine learning methods including supervised learning methods (e.g., Gaussian process regression, Naive Bayes classifier, conditional random field, etc.); unsupervised learning methods (e.g., expectation-maximization algorithm, vector quantization, generative topographic map, information bottleneck method, etc.); and semi-supervised learning methods (e.g., generative models, low-density separation, graph-based methods, heuristic approaches, etc.) to the training dataset for formulating one or more optimized models for recognizing the objects. During operation, the object recognition device 108 may apply the optimized models to the object images received from the imaging device 112 to recognize the corresponding objects.

Figure 2:
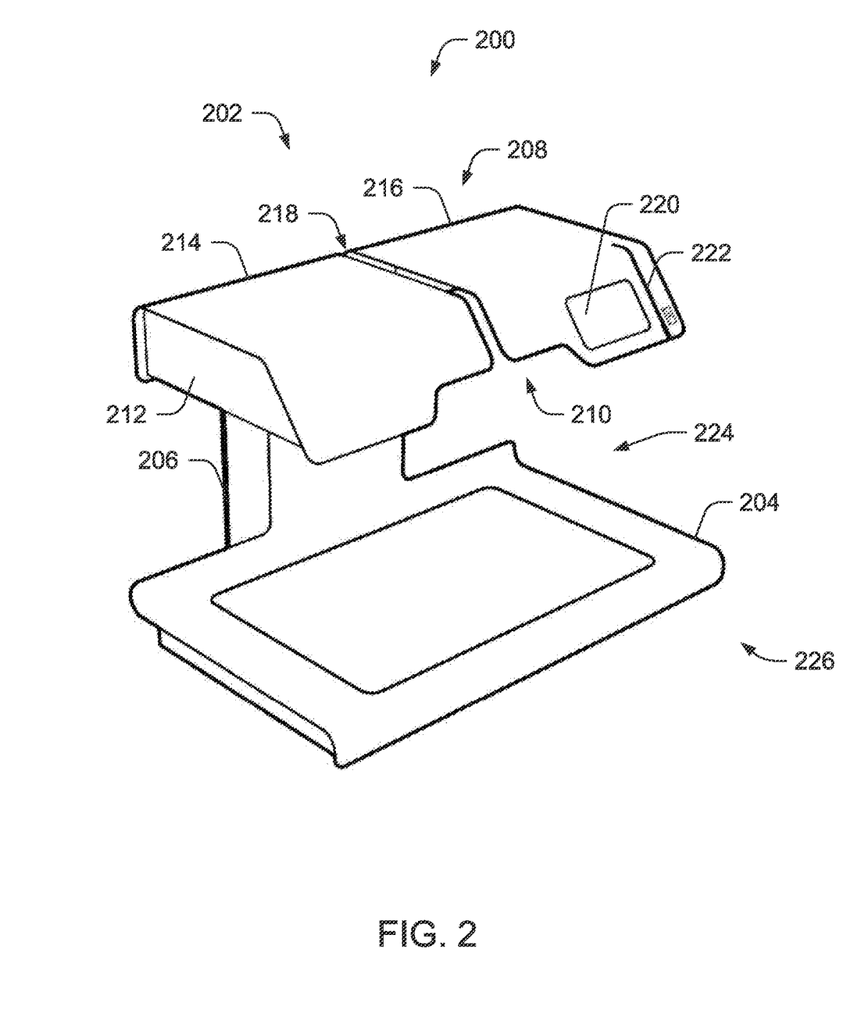
FIG. 2 is a perspective view of an exemplary automated object recognition kiosk, according to an embodiment of the present disclosure.

FIG. 2 is a perspective view of an exemplary automated object recognition kiosk, according to an embodiment of the present disclosure. In one embodiment, the automated object recognition kiosk 200 may implement the object recognition system 100 for retail checkouts. The kiosk 200 may include a head portion 202, a base portion 204, and a support panel portion 206 configured to support the head portion 202 and the base portion 204 of the kiosk 200. The head portion 202, the base portion 204, and the support panel portion 206 may be made of any rigid and durable material known in the art, related art, or developed later including metals, alloys, composites, and so on, or any combination thereof, capable of withstanding heat generated by the electronics integrated with the kiosk components.

In one embodiment, the head portion 202 may include a top surface portion 208, a bottom surface portion 210, and a compartment between them. The compartment may be configured to receive or embed hardware electronics. The top surface portion 208 may include a flat portion and an inclined portion having a predetermined slope relative to the flat portion. In one example, the slope may be substantially perpendicular to the descending line of sight of a user on the inclined portion. The compartment may secure the illumination device 110 and the imaging device 112. The bottom surface portion 210 may be located opposite to the base 204 may be substantially flat to avoid shadows being created due to relative variation in the bottom surface portion 210. Further, the bottom surface portion 210 of the head portion 202 may be located opposite to the base portion 204 of the object recognition kiosk 200. The bottom surface portion 210 may be capable of passing light generated by the illumination device 110 on to the base portion 204 of the object recognition kiosk 200. The bottom surface portion 210 may be made up of or coated with any of the anti-glare materials known in the art, related art, or developed later to evenly project light on the object to be recognized. Such coated bottom surface portion 210 may minimize the projection of shadows due to reflection of illuminated light from the object and its surroundings. The shadows need to be minimized so that the object data (e.g., an object image and its attributes such as color, brightness, texture, etc.) as gathered by the imaging device 112 may be optimally separated from a predetermined background such as the base portion 204 by the implemented computer vision and machine learning methods.

The head portion 202 may include side surfaces such as a side surface 212 in communication with lateral edges of the top surface portion 208 and the bottom surface portion 210 of the head 202. The side surfaces may facilitate to reduce unwanted dissipation of generated light into the ambient surrounding and to focus the generated light on to the base portion 204 of the object recognition kiosk 200.

In one embodiment, the head portion 202 may be divided into a first part 214 and a second part 216, each having a respective top surface 208, a bottom surface 210 and a compartment for housing the corresponding electronic components such as the illumination device no and the imaging device 112. The first part 214 and the second part 216 may have a predetermined spacing 218 between them to support electronics for separate operation based on predetermined aesthetics of the head portion 202. At least one of the first part 214 and the second part 216 may include a display device such as an interactive display screen 220 to interact with a user. Dimensions of the first part 214 may be similar to the dimensions of the second part 216. However, the relative dimensions of the first part 214 and the second part 216 may differ from each other in some embodiments. In further embodiments, the head portion 202 may be integrated with a variety of payment devices known in the art, related art, or developed later. For example, the second part 216 may include a predetermined card reader 220 to receive payments based on the object being recognized by the object recognition kiosk 200. Both the first part 214 and the second part 216 may be secured to the support panel portion 206 using various known in the art, related art, or developed later fastening techniques including a nut and screw arrangement, welding, push-on joint sockets, and so on.

The base portion 204 may refer to any surface, which may be sufficiently illuminated by the light projected from the head portion 202 of the object recognition kiosk 200. In some embodiments, the base portion 204 may be coated with the anti-glare material for minimizing shadow projections on the object. In the illustrated embodiment, the base portion 204 may be coupled to the support panel portion 206 below the head portion 202 of the object recognition kiosk 200. The base portion 204 may have a substantially flat surface opposite to the bottom surface portion 210 of the head portion 202 so that an image of the object placed on the base portion 204 may be appropriately captured by the imaging device 112. In some embodiments, the base portion 204 may be an elevated surface from the ground and substantially parallel to the bottom surface portion 210. In some other embodiments, a predetermined region may be marked or relatively indented uniformly on the base portion 204 to indicate that the predetermined region is capable of being sufficiently illuminated by the illumination device no irrespective of ambient lighting conditions. The base portion 204 may be substantially separated by a predefined distance from the head portion 202 for accommodating at least one object in a space, hereinafter referred to as an examination space 224, between the base portion 204 and the head portion 202.

The front side 226 of the examination space 224 may be kept open to allow placement of objects. Rest of the sides of the examination space 224 may be left partially or fully open depending on the ambient lighting conditions in which the kiosk 200 is used so that most of the lighting may be provided internally through the kiosk's own lighting system such as the illumination device 110. Some tolerance for external ambient lighting may be achieved using a calibration pattern 520 for the base portion 204 and/or by adjusting various camera properties such as exposure, white balance, and gain.

The calibration pattern may include various colors such as red, green, blue, white, black and their shades or combinations. The calibration pattern may be implemented as a software program in a computer readable medium such as a smartcard, which may be integrated, or in communication, with the object recognition kiosk 200 and used by the object recognition device 108 to measure the change in ambient lighting and the effect of this lighting change on colors perceived by the imaging device 112. The calibration pattern may also be used by the controller 102 to determine the exact position of the imaging devices (e.g., the imaging device 112) relative to the base portion 204, to the object, and/or to each other. The calibration pattern may be in any shape such as squares, color wheel or just smeared in any kind of shape into the base portion 204.

Figure 3:
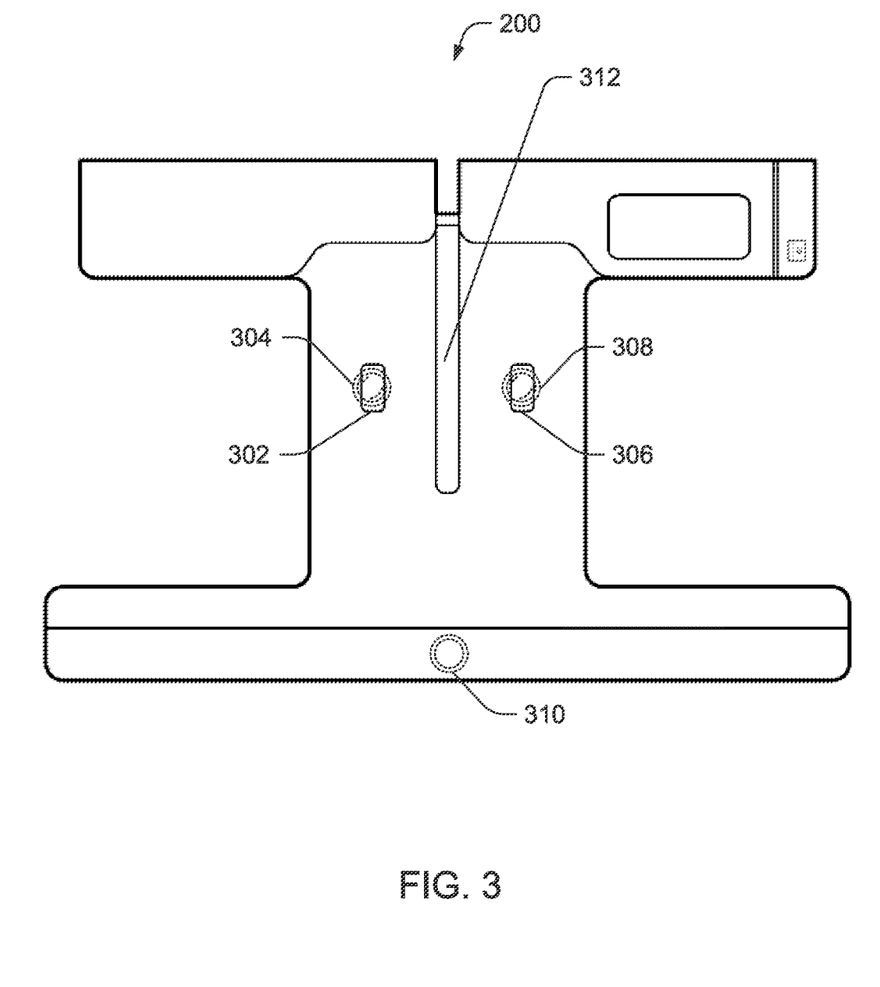
FIG. 3 is a front view of the exemplary automated object recognition kiosk of FIG. 2, according to an embodiment of the present disclosure.

FIG. 3 is a front view of the exemplary automated object recognition kiosk 200 of FIG. 2, according to an embodiment of the present disclosure. In one embodiment, the support panel portion 206 may include one or more openings for securing at least one imaging device 112 to capture an image of the object held between the base portion 204 and the head portion 202. In the illustrated example, the support panel portion 206 may include a first opening 302 securing a first imaging device 304 and a second opening 306 securing a second imaging device 308. In some embodiments, at least one of the first imaging device 304 and the second imaging device 308 may behave as a tracking imaging device to track the movement of a support structure such as a human hand temporarily in communication with the object for introducing the object to be recognized within the examination space 224 between the base portion 204 and the bottom surface portion 210 of the head portion 202. The object recognition device 108 analyzes images created or captured by the tracking imaging device to track the movement of the support structure. Other embodiments may include the base portion 204 having one or more measurement sensors such as a weight sensor 310 for determining the weight of an object to be recognized upon being placed on the base portion 204.

Further, the support panel portion 206 may have a slit 312 perpendicular to the spacing 218 between the first part 214 and the second part 216 of the head portion 202. The slit 312 may extend along the longitudinal axis of the support panel portion 206 from a first end of the support panel portion 206 to the mid of the support panel portion 206. The first end of the support panel portion 206 may be adjacent to the head portion 202 of the object recognition kiosk 200. The slit 312 may facilitate incorporation of electronics separately for the first imaging device 304 and the second imaging device 308 and may support aesthetics of the object recognition kiosk 200.

Figure 4:
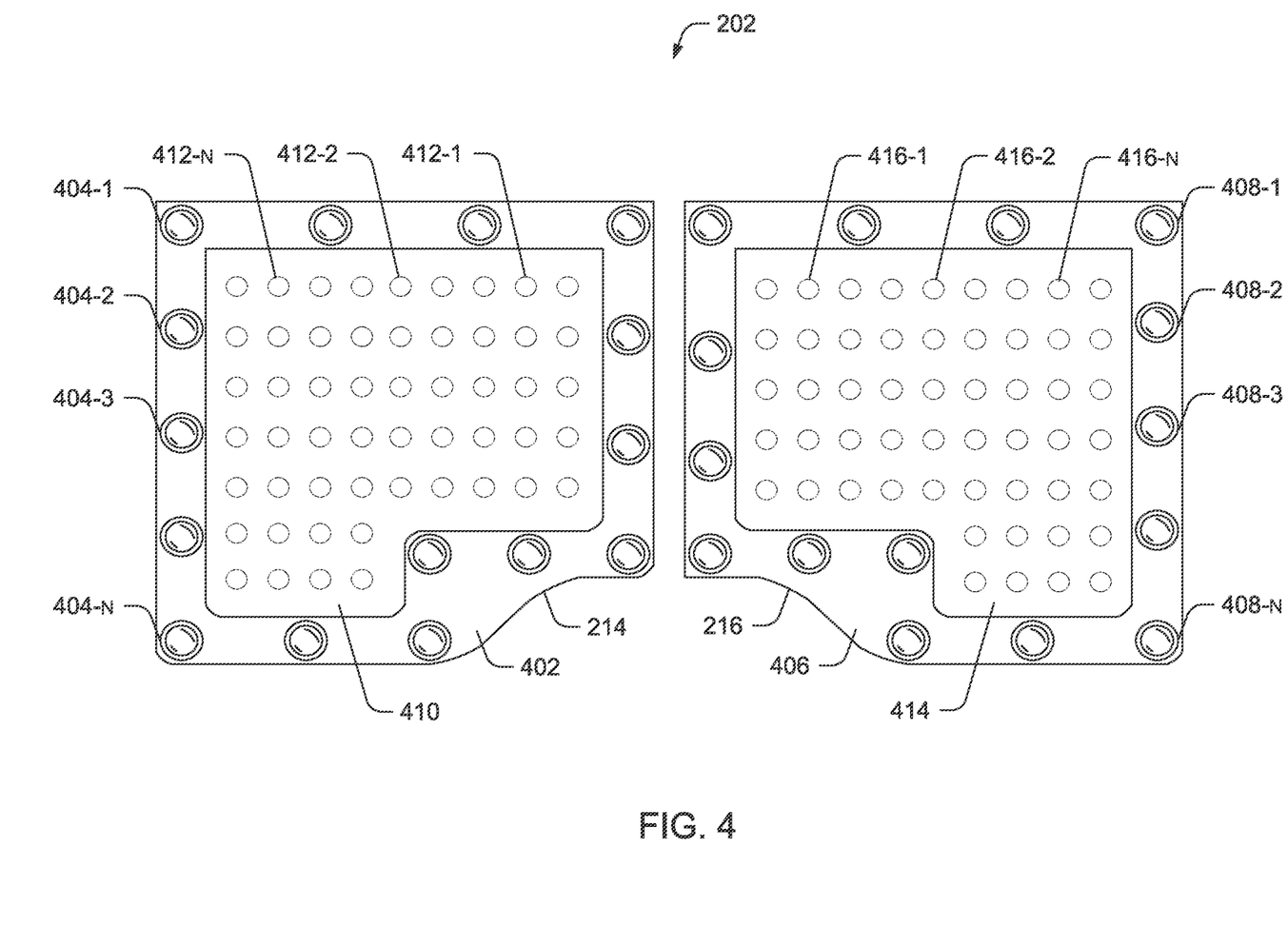
FIG. 4 is a portion of the exemplary automated object recognition kiosk of FIG. 2, according to an embodiment of the present disclosure.

FIG. 4 is a portion of the exemplary automated object recognition kiosk 200 of FIG. 2, according to an embodiment of the present disclosure. The illustrated embodiment shows respective compartments in each of the first part 214 and the second part 216 of the head portion 202 upon being viewed from the bottom surface portion 210. Each of the compartments may include an imaging region and an illumination region. In one embodiment, the imaging region may be a relatively narrow region defined substantially along the edges of the first part 214 and the second part 216. The illumination region may be a region surrounded by the imaging region. The illumination region may have a dimension substantially greater than the dimension of the imaging region.

The imaging region may be configured to secure one or more imaging devices and the illumination region configured to secure one or more illumination devices. For example, an imaging region 402 of the first part 214 may include imaging devices such as cameras 404-1, 404-2, . . . , 404-n (collectively, cameras 404) and an imaging region 406 of the second part 216 may include imaging devices such as cameras 408-1, 408-2, . . . , 408-n (collectively, cameras 408). Similarly, a first illumination region 410 corresponding to the first part 214 may include the illumination devices such as light emitting diode (LED) lights 412-1, 412-2, . . . , 412-n (collectively, LED lights 412) and a second illumination region 414 corresponding to the second part 216 may include the illumination devices such as LED lights 416-1, 416-2, . . . , 416-n (collectively, LED lights 416). In a first example, the cameras 404, 408 may be two-dimensional cameras (2D cameras) or three-dimensional cameras (3D cameras), or any combination thereof. The 2D cameras may be used to collect image sequences of objects from multiple viewpoints, and 3D cameras may be used to get 3D point cloud of objects. Multiple viewpoints facilitate to overcome occlusion as the far side of an object may not be visible to an individual camera, or in case there are multiple objects on the base portion 204 of the kiosk 200, with some partially or fully hidden from the view of an individual camera. The camera properties such as exposure, white balance, gain, focus, pan, tilt, saturation and others may be carefully determined and usually pre-set during the operation life of the kiosk 200. These camera properties may be predefined to values such that changes to the ambient lighting conditions may be partially compensated by adjusting the values of these properties.

In a second example, the cameras 404, 408 may be a color video camera such as an HD webcam with at least one imaging channel for capturing color values for pixels corresponding generally to the primary visible colors (typically RGB). In a third example, the cameras 404, 408 may be infrared cameras with at least one imaging channel for measuring pixel intensity values in the near-infrared (NIR) wavelength range. In a fourth example, the cameras 404, 408 may be hybrid devices capable of capturing both color and NIR video. In a fifth example, the cameras 404, 408 may be multi/hyperspectral cameras capable of capturing images at multiple wavelength bands.

The cameras 404, 408 may be configured with at least one of the adaptive steering technology and the controlled steering technology known in the art, related art, or developed later for maneuvering the direction of the imaging device 112 for capturing images based on the position of the object within the examination space 224. Further, the intensity of the LED lights 412, 416 may be sufficiently high so that the ambient light received by the examination space 224 and/or the base portion 204 is minimal. The light generated by the LED lights 412, 416 may be substantially white light so that colors of the objects to be recognized may be optimally visible and captured by the cameras 404, 408.

Figure 5:
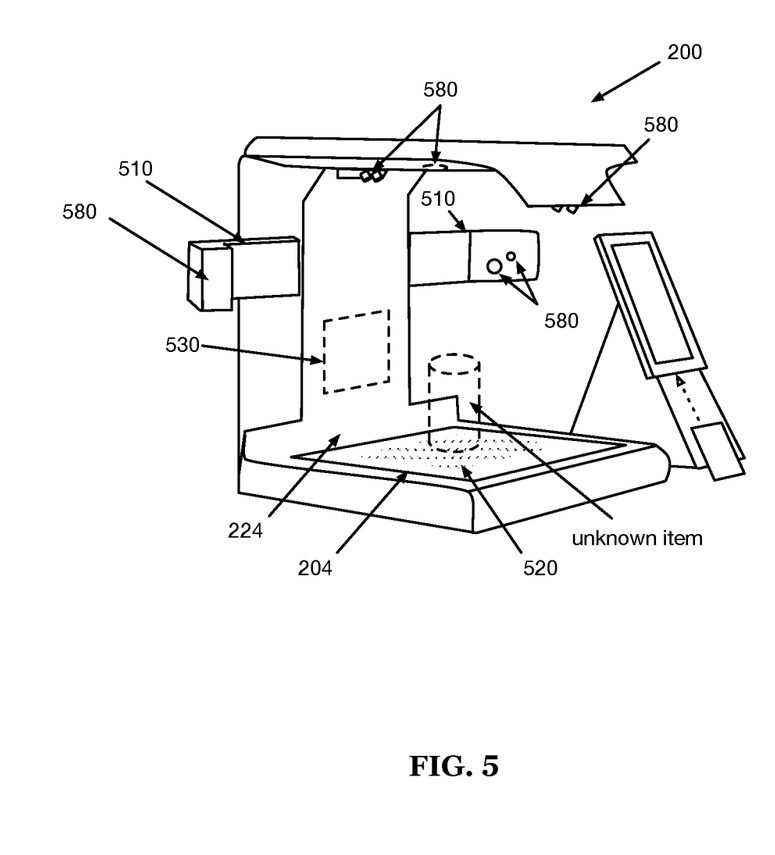
FIG. 5 depicts an example of the system.

FIG. 5 depicts an example of the automated object recognition kiosk 200. The automated object recognition kiosk 200 functions to sample images of the items. The kiosk can include: a kiosk housing defining an examination space 224, and a set of sensors 580 monitoring the examination space 224 (e.g., shown in FIG. 5). The kiosk 200 is preferably located at the edge (e.g., onsite at a user facility), but can alternatively be located in another venue.

The kiosk housing functions to define the examination space 224 (e.g., measurement volume), and can optionally retain the sensors in a predetermined configuration about the measurement volume. The kiosk housing can optionally define one or more item insertion regions (e.g., between housing walls, between housing arms, along the sides or top of the measurement volume, etc.) along one or more sides of the housing. The housing can include: a base 204 and one or more arms, wherein the measurement volume is defined between the base and arm(s). The one or more arms can house the processing system 580 and/or any other suitable components. The one or more arms can be the support panel portion 206 and/or any other components of the system.

The base 204 is preferably static relative to the arms and/or sensors, but can alternatively be mobile (e.g., be a conveyor belt). The base preferably includes a calibration pattern, but can alternatively have no pattern, have a solid color (e.g., black), be matte, be reflective, or be otherwise optically configured. However, the base can be otherwise configured.

The calibration pattern 520 preferably functions to enable camera calibration for the imaging device (e.g., enables the system to determine the location of each camera with reference to a common coordinate system). The calibration pattern can be used to determine one or more calibration matrices for: a single camera, a stereocamera pair, and/or any other suitable optical sensor. The calibration matrices can be: intrinsic calibration matrices, extrinsic calibration matrix relating the camera to the measurement volume, extrinsic matrices relating the cameras to each other, and/or other calibration matrices. The calibration pattern is preferably arranged on (e.g., printed on, stuck to, mounted to, etc.) the base of the housing, but can alternatively be arranged along an interior wall, an arm, and/or otherwise arranged. The calibration pattern (or portions thereof) preferably appear in each optical sensor's field of view, but can alternatively appear in all RGB sensors' fields of view, a subset of the optical sensors' fields of view, and/or otherwise appear in the images. The calibration pattern is preferably axially asymmetric (e.g., along one or more axes, such as the x-axis, y-axis, etc.), but can alternatively be symmetric along one or more axes. The calibration pattern can be an array of shapes (e.g., circles, squares, triangles, diamonds, etc.), a checkerboard, an ArUco pattern, a ChArUco pattern, multiple CharuCo targets (e.g., arranged as a checkerboard, grid, etc.), a circle grid pattern, an image, a logo (e.g., of the merchant), and/or any other calibration pattern. The calibration pattern can include one or more colors (e.g., red, green, blue, and/or various shades or combinations) and/or be black and white. The parameters of the calibration pattern (e.g., shape size, shape arrangement, pattern alignment with the measurement volume's axes, pattern pose relative to the measurement volume, etc.) are preferably known, but can alternatively be unknown. The calibration can be raised (e.g., less than 1 mm, less than 2 mm, less than 5 mm, etc.) or smooth (e.g., planar). However, the calibration pattern can be otherwise configured.

The arms 510 are preferably static, but can alternatively be actuatable. The arms can extend from the base (e.g., perpendicular to the base, at a non-zero angle to the base, etc.), extend from another arm (e.g., parallel the base, at an angle to the base, etc.), and/or be otherwise configured. The arms 510 can be arranged along the side of the measurement volume, along an upper portion of the measurement volume, and/or otherwise arranged. Alternatively, the kiosk can not have arms. The housing can optionally include a top, wherein the top can bound the vertical extent of the measurement volume and optionally control the optical characteristics of the measurement volume (e.g., by blocking ambient light, by supporting lighting systems, etc.). However, the housing can be otherwise configured.

The sensors 580 function to sample measurements of the items within the measurement volume. The sensors are preferably mounted to the arms of the kiosk housing, but can additionally or alternatively be mounted to the housing side(s), top, bottom, threshold (e.g., of the item insertion region), corners, front, back, and/or any other suitable portion of the housing. The sensors are preferably arranged along one or more sides of the measurement volume, such that the sensors monitor one or more views of the measurement volume (e.g., left, right, front, back, top, bottom, corners, etc.). The sensors can be arranged such that they collectively monitor a predetermined percentage of the measurement volume's points of view (e.g., greater than 20%, greater than 50%, greater than 70%, greater than 80%, etc.), which can provide more viewing angles for an unknown item, but can alternatively monitor a smaller proportion. The sensors can be arranged such that each imaging sensor's field of view encompasses the calibration pattern on the base of the housing, a portion of the calibration pattern (e.g., greater than 60%, greater than 70%, greater than 80%, etc.), none of the calibration pattern, and/or any other feature of the housing or portion thereof. The sensors can be arranged with an active surface directed: downward, upward, to the side (e.g., left, right, forward, back), toward a measurement volume corner or edge (e.g., left, right, back, front, top, bottom, combination thereof, etc.), and/or otherwise arranged. In a specific example, the sensors are arranged along at least the left, right, back, and top (e.g., head edge, head central region, etc.) of the measurement volume. However, the sensors can be otherwise arranged.

The kiosk preferably includes multiple sensors, but can alternatively include a single sensor. The sensor(s) can include: imaging devices (e.g., 404, 408, etc.), illumination devices (e.g., 412, 416, etc.), depth sensors, weight sensors (e.g., arranged in the base), acoustic sensors, touch sensors, proximity sensors, and/or any other suitable sensor. An imaging device functions to output one or more images of the examination space (e.g., image of the items within the measurement volume), but can additionally or alternatively output 3D information (e.g., depth output, point cloud, etc.) and/or other information. The imaging device can be a stereocamera system (e.g., including a left and right stereocamera pair), a depth sensor (e.g., projected light sensor, structured light sensor, time of flight sensor, laser, etc.), a monocular camera (e.g., CCD, CMOS), and/or any other suitable imaging device.

In a specific example, the automated object recognition kiosk 200 includes stereocamera systems mounted to at least the left, right, front, and back of the measurement volume, and optionally includes a top-mounted depth sensor and/or top-mounted imaging system (e.g., stereocamera system).

The automated object recognition kiosk 200 may be implemented in different business scenarios, such as for retail checkouts. For this, the automated object recognition kiosk 200 may be trained to obtain a model using various computer vision and machine learning methods known in the art, related art, or developed later. The obtained model may be stored in the storage device 106 and applied by the object recognition device 108 for recognizing products such as one or more fresh foods including, but not limited to, fresh fruits and vegetables, dairy products, freshly prepared eatables such as curries, breads, pastas, salads, and burgers; or any combination thereof.

In order to train the kiosk 200, the controller 102 may (1) configure a predetermined calibration pattern based on the ambient lighting conditions, (2) initialize predefined or dynamically defined attributes of the cameras and the LED lights based on the ambient lighting conditions, (3) calibrate relative positions of the cameras with respect to each other and/or at least one of the base portion 204 and the product; and (4) adaptively tune the LED lights to generate relatively white light for illuminating the base portion 204 to a predetermined level of brightness, upon the kiosk 200 being switched ON. The predetermined brightness level of the illuminated base portion 204 may be relatively greater than the brightness of the ambient light entering into the examination space 224 between the head portion 202 and the base portion 204 of the kiosk 200. Subsequently, the automated object recognition kiosk 200 may be fed with details of inventory products including packaged as well as fresh products in a retail store either directly through the interactive display screen 220, or via a connection to a point of sale (POS) terminal (not shown) over the network. The details may include product name, product type, price, manufacturing date, expiry date, batch identification number, quantity, package dimensions, etc. and may be stored in an inventory or object database in the storage device 106.

One or more products for which the kiosk 200 need to be trained, such products may be introduced within the examination space 224 by a user. In one example, one or more products such as fresh items, which may not be covered with an opaque covering such as a package cover, a human hand, etc., may be introduced within the examination space 224. The products may be exposed to the light generated by the illumination device 110 such as the LEDs 412, 416 and the imaging devices such as the cameras 404, 408. Each product may be placed in multiple positions and orientations at a predefined location such as on a predetermined region of the base portion 204. The placed product may be directly imaged by one or more imaging devices such as the cameras 404, 408 to capture multiple images of the products. The captured images may be stored in the storage device 106 of the kiosk 200.

The controller 102 may be configured to feed the captured images as a training dataset to the object recognition device 108, which may be configured to extract multiple features (e.g., brightness, contrast, hue, size, shape, texture, etc.) from the captured images of the products. The object recognition device 108 may use extracted features as inputs to a predetermined computer vision and machine learning method that may formulate an optimized model based on the extracted features. The optimized model may be saved in the storage device 106 by the object recognition device 108. Similarly, the automated object recognition kiosk 200 may be trained for various package covers used to pack or carry or hold the products, for example, the fresh items.

In order to recognize the product, the object recognition kiosk 200 may be configured with relatively the same values for at least one of the initialization parameters being implemented for training the kiosk 200. Examples of these initialization parameters include, but not limited to, calibration pattern, attributes of the cameras 304, 308, 404, 408 and the LED lights 412, 416, relative positions of the cameras 304, 308, 404, 408, brightness level of the LED lights 412, 416. However, in some embodiments, the values of the initialization parameters may vary from their training values based on the ambient light conditions and relative positions of the cameras 304, 308, 404, 408, the base portion 204, and the products to be recognized.

A user may introduce one or more products within the examination space 224 of the automated object recognition kiosk 200. Multiple cameras of the kiosk 200 may simultaneously capture multiple images of the product from different positions and orientations. The captured images may be fed to the object recognition device 108 by the controller 102. The object recognition device 108 may extract multiple features from the received images and apply the optimized model stored in the storage device 106 to these extracted features for recognizing the product based on the inventory product details stored in the storage device 106. Upon recognizing the product, the controller 102 may provide a visual, audio or textual indication to a user. For example, the controller 102 may provide a pop-up message on the interactive display screen 220 with a beep to indicate a user that the product has been recognized. Additionally, the controller 102 may provide related details of the recognized product including, but not limited to, name, type, quantity, price, etc. on the display screen for the user. Some embodiments in which the product was placed on the kiosk base portion 204 equipped with a weight sensor, the controller 102 may display the weight of the product on the interactive display screen 220. In some embodiments, the controller 102 may provide the indication regarding the product on one or more computing devices such as a mobile phone of the user over the network. The user may use the received indication to pay for the product at a payment device such as a credit card reader, which may be integrated with the kiosk 200, or at a POS terminal in communication with the kiosk 200, for completing the product purchase and the related transaction. In some embodiments, the payment device or the POS terminal may not be in communication with the kiosk 200.

In order to return a purchased product, the user may re-introduce the product within the examination space 224. The object recognition device 108 may recognize the product using the optimized model as discussed above and provide an indication to the user. Based on the indication, a predetermined amount may be returned to the user as per one or more predefined criteria either directly by asking the user to swipe his credit or debit card against a card reader or by a cashier at the POS terminal. Examples of the predefined criteria may include, but not limited to, the product being rescanned by the cameras may be returned only within two hours from the time of purchase; the package cover of the purchase product should not be tampered with for the product being returned; products may not be eligible for return after purchase, etc.

Exemplary embodiments are intended to cover all software or computer programs capable of performing the various heretofore-disclosed determinations, calculations, etc., for the disclosed purposes. For example, exemplary embodiments are intended to cover all software or computer programs capable of enabling processing systems to implement the disclosed processes. In other words, exemplary embodiments are intended to cover all systems and processes that configure a computing device to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

In accordance with the exemplary embodiments, the disclosed computer programs may be executed in many exemplary ways, such as an application that is resident in the storage device 106 of a device or as a hosted application that is being executed on a server or mobile computing device, and communicating with the device application or browser via a number of standard protocols, such as TCP/IP, HTTP, XML, SOAP, REST, JSON and other sufficient protocols. The disclosed computer programs may be written in exemplary programming languages that execute from memory on the computing device or from a hosted server, such as BASIC, COBOL, C, C++, Java, Pascal, or scripting languages such as JavaScript, Python, Ruby, PHP, Perl or other sufficient programming languages.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

I claim:

1. A checkout kiosk, comprising:
   a set of support components;
   a head component;
   a base component configured to receive an object, wherein the support component statically connects the base component and the head component, wherein the set of support components, the head component, and the base component cooperatively surround a measurement volume on at least three sides, the at least three sides comprising a bottom side and a top side, wherein the head component encloses a top of the measurement volume;
   a first, second, and third optical system positioned proximal to a first, second, and third geometric feature of the head component, respectively, and having a respective field of view which encompasses a fourth, fifth, and sixth geometric feature of the base component, respectively, wherein the fourth, fifth, and sixth geometric features are opposite the first, second, and third geometric features, respectively; and
   a processing system configured to automatically recognize at least one food object using an image from at least one of the optical systems.

2. The checkout kiosk of claim 1, further comprising a fourth optical sensor mounted to a central region of the head component and directed downward.

3. The checkout kiosk of claim 1, further comprising a fourth optical sensor positioned proximal to a seventh geometric feature of the head component, the fourth optical sensor having a field of view which encompasses an eighth geometric feature of the base component, wherein the eighth geometric feature is opposite the seventh.

4. The checkout kiosk of claim 1, wherein the set of support components comprises a first support component which statically connects the head component to the base component along a back edge of the base component.

5. The checkout kiosk of claim 4, wherein the first geometric feature is a front edge of the head component, wherein the second geometric feature is a left edge of the head component, wherein the third geometric feature is a right edge of the head component.

6. The checkout kiosk of claim 1, wherein at least two of the first, second, and third optical systems are mounted with a set of arms.

7. The checkout kiosk of claim 6, wherein the head comprises a left arm and a right arm of the set of arms, wherein the first geometric feature is a first edge of the left arm, wherein the second geometric feature is a second edge of the right arm.

8. The checkout kiosk of claim 1, wherein the front of the measurement volume is open.

9. The checkout kiosk of claim 1, further comprising a light component mounted to the head component and configured to illuminate the measurement volume with diffused light.

10. The checkout kiosk of claim 1, wherein a first extent of the head component, from a left edge of the head component to a right edge of the head component, extends beyond a first extent of the base component, from a left edge of the base component to a right edge of the base component, wherein a second extent of the head component, from a front edge of the head component to a back edge of the head component, is at least coextensive with a second extent of the base component, from a front edge of the base component to a back edge of the base component.

11. The checkout kiosk of claim 1, further comprising a weight sensor mounted to the base component.

12. The checkout kiosk of claim 1, wherein the processing system is communicatively connected to a POS terminal, wherein the processing system is automatically configured to generate a transaction based on the recognized food object.

13. The checkout kiosk of claim 1, wherein each of the geometric features is an edge, face, or vertex.

14. The checkout kiosk of claim 13, wherein each of the first, second, and third optical systems is substantially centered along a respective edge or face.

15. A system for object identification, comprising:
   housing with an open front open end, the housing comprising:
      a base configured to receive an object;
      a head portion, wherein a first extent of the head portion is at least coextensive with a first extent of a measurement volume, from a left edge of the measurement volume to a right edge of the measurement volume, wherein a second extent of the head portion is at least coextensive with a second extent of the measurement volume, from a front edge of the measurement volume to a back edge of the measurement volume; and
      a set of supports statically connecting the base and the head portion;
   a first and second optical system positioned proximal to the left edge of the head portion and right edge of the head portion, respectively, the first and second optical systems having a field of view which encompasses the right edge of the base and left edge of the base, respectively; and
   a processing system configured to automatically recognize at least one food object using an image from at least one of the optical systems.

16. The system of claim 15, further comprising a set of arms mounting a third and fourth optical system on opposing sides of the housing.

17. The system of claim 15, further comprising set of arms mounting a third, fourth, fifth, and sixth optical system, respectively, each of the third, fourth, fifth, and sixth optical systems having a field of view directed towards respective corner of the base across a diagonal of the measurement volume.

18. The system of claim 15, further comprising third optical sensor mounted to a central region of the head portion and directed downward towards the base.

19. The system of claim 15, wherein the set of supports, the head portion, and the base cooperatively surround a measurement volume on at least three sides, the at least three sides comprising a bottom side and a top side, wherein the head portion encloses a top of the measurement volume.

20. The system of claim 15, wherein the first extent of the head portion extends beyond the first extent of the measurement volume.

* * * * *